US012670450B2

(12) United States Patent
Kancham et al.

(10) Patent No.: US 12,670,450 B2
(45) Date of Patent: Jun. 30, 2026

(54) COMPUTER-BASED SYSTEM FOR PROVIDING AUTOMATIC STREAMLINE ALERTING BY INTEGRATING WITH SOURCE OF TRUTHS

(71) Applicant: Capital One Services, LLC, McLean, VA (US)

(72) Inventors: Naveen Kumar Kancham, McLean, VA (US); Naman Kaushal, McLean, VA (US); Jose M. Ortiz, McLean, VA (US); Rekha Sivakolundhu, McLean, VA (US); Vishi Cline, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/790,959

(22) Filed: Jul. 31, 2024

(65) Prior Publication Data

US 2026/0037887 A1     Feb. 5, 2026

(51) Int. Cl.
*G06Q 10/0631*       (2023.01)
(52) U.S. Cl.
CPC .............................. *G06Q 10/06311* (2013.01)
(58) Field of Classification Search
None
See application file for complete search history.

(56) References Cited

U.S. PATENT DOCUMENTS 8,762,190 B1    6/2014  Solomon et al.
8,799,043 B2    8/2014  Motoyama et al.
9,336,494 B1 *  5/2016  Purpura ................. G06N 20/00
10,115,065 B1   10/2018  Fama et al.
2003/0061090 A1  3/2003  Marano
2005/0165631 A1  7/2005  Horvitz
(Continued)

OTHER PUBLICATIONS

Smith, John A. "Automation of Network Management and Incident Response." International Journal of Artificial Intelligence and Machine Learning 2.7 (2020) (Year: 2020).*

(Continued)

*Primary Examiner* — Darlene Garcia-Guerra

(74) *Attorney, Agent, or Firm* — GREENBERG TRAURIG, LLP

(57)         ABSTRACT

In certain embodiments, a system and accompanying method configured to provide automatic streamline alerting by integrating with source of truths and methods of use thereof is provided. In particular, the system detects a triggering condition, such as an anomaly affecting a computing system. An automated action is executed to attempt to resolve the triggering condition. An integrated source of truth system obtains data including mappings between responders and the computing system. Based on the data and by utilizing an artificial intelligence model, a prediction is generated for a schedule for at least one responder to resolve the triggering condition affecting the computing system. A notification is transmitted to the at least one transmitter in accordance with the schedule to resolve the triggering condition. The artificial intelligence model is then trained based on the prediction, the data, resolution of the triggering condition, other training data, or a combination thereof.

20 Claims, 7 Drawing Sheets

(56)     References Cited

U.S. PATENT DOCUMENTS

| | | | |
|---|---|---|---|
| 2009/0055270 A1* | 2/2009 | Magdon-Ismail | G06F 16/957 |
| | | | 705/14.27 |
| 2010/0287011 A1* | 11/2010 | Muchkaev | A63F 13/792 |
| | | | 706/45 |
| 2011/0288900 A1 | 11/2011 | McQueen et al. | |
| 2012/0101867 A1* | 4/2012 | Zgardovski | G06Q 10/063112 |
| | | | 705/7.14 |
| 2013/0103973 A1* | 4/2013 | Werth | H04L 41/0816 |
| | | | 714/2 |
| 2014/0350988 A1 | 11/2014 | Ricketts | |
| 2020/0210965 A1* | 7/2020 | Garber | G06Q 10/06311 |
| 2021/0089384 A1* | 3/2021 | Eberlein | G06F 11/0793 |
| 2022/0270021 A1 | 8/2022 | Glocker | |
| 2022/0357733 A1* | 11/2022 | Crane | G05B 23/0281 |
| 2022/0357940 A1* | 11/2022 | Crane | G06F 11/3089 |
| 2023/0259821 A1* | 8/2023 | Travalini | G06N 3/0455 |
| | | | 706/12 |
| 2025/0173607 A1* | 5/2025 | Talwalkar | G06N 20/00 |

OTHER PUBLICATIONS

Bhanage, Deepali Arun, Ambika Vishal Pawar, and Ketan Kotecha. "IT infrastructure anomaly detection and failure handling: A systematic literature review focusing on datasets, log preprocessing, machine & deep learning approaches and automated tool." IEEE Access 9 (2021): 156392-156421 (Year: 2021).*

* cited by examiner

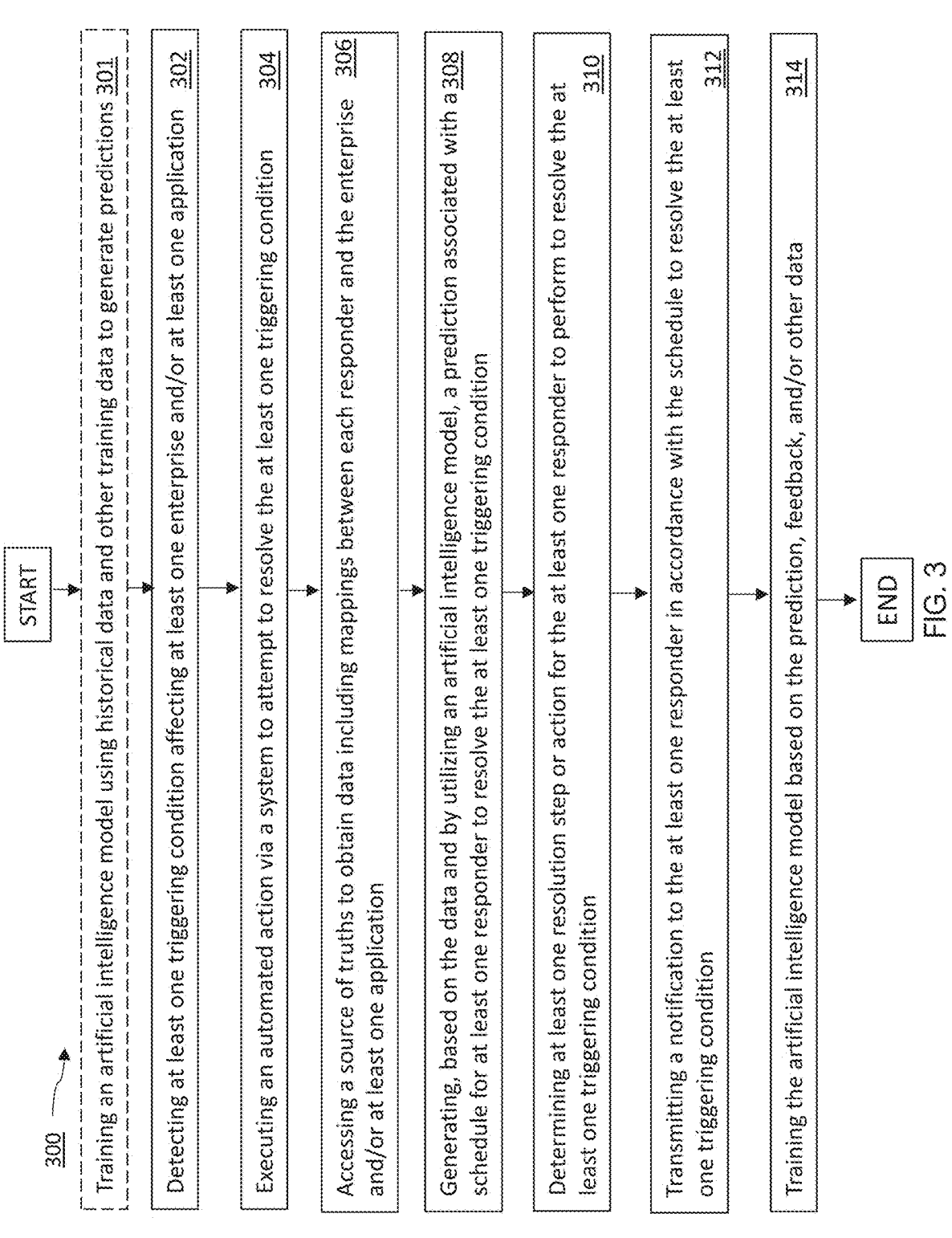

START

Training an artificial intelligence model using historical data and other training data to generate predictions 301

Detecting at least one triggering condition affecting at least one enterprise and/or at least one application   302

Executing an automated action via a system to attempt to resolve the at least one triggering condition   304

Accessing a source of truths to obtain data including mappings between each responder and the enterprise   306 and/or at least one application Generating, based on the data and by utilizing an artificial intelligence model, a prediction associated with a 308 schedule for at least one responder to resolve the at least one triggering condition Determining at least one resolution step or action for the at least one responder to perform to resolve the at least one triggering condition   310

Transmitting a notification to the at least one responder in accordance with the schedule to resolve the at least one triggering condition   312

Training the artificial intelligence model based on the prediction, feedback, and/or other data   314

END

COMPUTER-BASED SYSTEM FOR PROVIDING AUTOMATIC STREAMLINE ALERTING BY INTEGRATING WITH SOURCE OF TRUTHS

FIELD OF TECHNOLOGY

The present disclosure generally relates to computer-based systems configured to provide automatic streamline alerting by integrating with source of truths and methods of use thereof.

BACKGROUND OF TECHNOLOGY

Computing systems regularly experience anomalies, downtime, or other disruptions and incidents that can materially affect or harm the operation of a business. In order to attempt to reduce the effect of disruptions and incidents, businesses often utilize available information technology personnel to address and rectify such disruptions and incidents. While existing computing systems track information technology personnel schedules for the purposes of deployment, such existing computing systems do not efficiently and effectively deploy information technology personnel and/or computing solutions in a manner that minimizes downtime, while also maximizing resolution of such disruptions and incidents.

SUMMARY OF DESCRIBED SUBJECT MATTER

In certain embodiments, the present disclosure provides an exemplary system for providing automatic streamline alerting by integrating source of truths with the system. In certain embodiments, the system may include a memory that stores instructions and a processor that executes the instructions to cause the processor to be configured to detect one or more triggering conditions affecting an enterprise computing system, a computer application, or a combination thereof. In certain embodiments, the processor can be configured to execute, in response to the one or more triggering conditions, an automated action via the system to attempt to resolve the one or more triggering conditions. In certain embodiments, the processor can be configured to access a source of truth system to obtain data including one or more mappings between each responder of a plurality of responders and the enterprise computing system, the computer application, or the combination thereof. In certain embodiments, the processor can be configured to generate, based on the data and by utilizing an artificial intelligence model, a prediction associated with a schedule for one or more one responders of the plurality of responders to resolve the one or more triggering conditions affecting the enterprise computing system, the computer application, or the combination thereof, wherein the prediction is based at least on the one or more mappings in the data. In certain embodiments, the processor can be configured to transmit, based on the prediction and if the automated action via the system fails to resolve the one or more triggering conditions, a notification to the one or more responders in accordance with the schedule to resolve the one or more triggering conditions affecting the enterprise computing system, the computer application, or the combination thereof.

In certain embodiments, the processor can be further configured to determine one or more resolution steps to recommend to the one or more responders to assist the one or more responder in resolving the one or more triggering conditions affecting the enterprise computing system, the computer application, or a combination thereof. In certain embodiments, the processor can be further configured to modify the prediction associated with the schedule in real-time based on receiving one or more signals associated with the plurality of responders, wherein the one or more signals provides an update to the data. In certain embodiments, the processor can be further configured to dynamically remove or add responders from the plurality of responders as the data from the source of truth system changes over time. In certain embodiments, the processor can be further configured to determine that the one or more triggering conditions include detection of one or more anomalies associated with the enterprise computing system, the computer application, or a combination thereof. In certain embodiments, the processor can be further configured to determine that the one or more triggering conditions include detection of a failure associated with the enterprise computing system, the computer application, or a combination thereof.

In certain embodiments, the processor can be further configured to integrate the source of truth system with the system. In certain embodiments, the source of truth system comprises a team repository, a human resource system, an off-boarding and on-boarding database, historical incidents data, or a combination thereof. In certain embodiments, the processor can be further configured to select the one or more responders of the plurality of responders based on the one or more mappings indicating that the one or more responders is capable of resolving the one or more triggering conditions. In certain embodiments, the processor can be further configured to detect one or more new triggering conditions affecting the enterprise computing system, the computer application, or a combination thereof, access the source of truth system to obtain updated data, and generate, based on the updated data and by utilizing the artificial intelligence model, a new prediction associated with the schedule for the one or more responders of the plurality of responders to resolve the one or more new triggering conditions. In certain embodiments, the processor can be further configured to determine whether the one or more responders resolved the one or more triggering conditions. In certain embodiments, the processor can be further configured to transmit, if the one or more responders did not resolve the one or more triggering conditions, a different notification to a different responder from the plurality of responders to resolve the one or more triggering conditions.

In certain embodiments, the processor can be further configured to output, if the one or more responders did resolve the one or more triggering conditions, a confirmation on a graphical user interface of a device that the one or more triggering conditions has been resolved. In certain embodiments, the automated action that can be executed to resolve the one or more triggering conditions can include execution of a reboot of the enterprise computing system, the computer application, or a combination thereof, switching traffic away from the enterprise computing system, the computer application, or a combination thereof, or execution of a self-healing operation on the enterprise computing system, the computer application, or a combination thereof. In certain embodiments, the processor can be further configured to train the artificial intelligence model based on the prediction, an accuracy of the prediction, feedback associated with resolving the one or more triggering conditions, the data, or a combination thereof.

In certain embodiments, the present disclosure provides an exemplary computer-implemented method providing automatic streamline alerting by integrating source of truths with a system. In certain embodiments, the method may be performed by utilizing a processor and/or other computer technology. In certain embodiments, the method may include detecting one or more triggering conditions affecting one or more enterprise computing systems, one or more computer applications, or a combination thereof. In certain embodiments, the method can include executing, in response to the one or more triggering conditions an automated action via an enterprise computing system to attempt to resolve the one or more triggering conditions. In certain embodiments, the method can include accessing a source of truth system to obtain data comprising one or more mappings between each responder of a plurality of responders, the one or more enterprise computing systems, the one or more computer applications, or the combination thereof. In certain embodiments, the method can include generating, based on the data and by utilizing an artificial intelligence scheduling model, a prediction associated with a schedule for one or more responders of the plurality of responders to resolve the one or more triggering conditions affecting the one or more enterprise computing systems, the one or more computer applications, or the combination thereof, wherein the prediction is based at least on the one or more mappings in the data. In certain embodiments, the method can include transmitting based on the prediction and if the automated action via the system fails to resolve the one or more triggering conditions, a notification to the one or more responders in accordance with the schedule to resolve the one or more triggering conditions affecting the one or more enterprise computing systems, the one or more computer applications, or the combination thereof.

In certain embodiments, the method can include selecting the one or more responders from the plurality of responders to receive the notification to resolve the one or more triggering conditions based on a most recent utilization of the one or more responders, one or more capabilities of the one or more responders, availabilities of the plurality of responders, or a combination thereof. In certain embodiments, the method can include training the artificial intelligence model based on one or more actions performed by the one or more responders with respect to the one or more triggering conditions. In certain embodiments, the method can include generating an updated prediction associated with the schedule in real-time as the data from the source of truth system changes. In certain embodiments, the method can include selecting one or more one other responders from the plurality of responders to resolve the one or more triggering conditions if the one or more triggering conditions are not resolved by the one or more responders. In certain embodiments, the method can include determining an action taken by the one or more responders to resolve the one or more triggering conditions. In certain embodiments, the method can include automatically executing the action taken by the one or more responders to resolve the one or more triggering conditions when the one or more triggering conditions occurs on a subsequent occasion.

In some embodiments, the present disclosure provides an exemplary non-transitory computer-readable medium comprising computer instructions, which, when loaded and executed by a processor, cause the processor to be configured to: detect at least one triggering condition affecting at least one enterprise computing system, at least one computer application, or a combination thereof; execute, in response to the at least one triggering condition, an automated action via the system to attempt to resolve the at least one triggering condition; access a source of truth system to obtain data comprising at least one mapping between each responder of a plurality of responders and the at least one enterprise computing system, the at least one computer application, or the combination thereof; generate, based on the data and by utilizing an artificial intelligence model, a prediction associated with a schedule for at least one responder of the plurality of responders to resolve the at least one triggering condition affecting the at least one enterprise computing system, the at least one computer application, or the combination thereof, wherein the prediction is based at least on the at least one mapping in the data; and transmit, based on the prediction and if the automated action via the system fails to resolve the at least one triggering condition, a notification to the at least one responder in accordance with the schedule to resolve the at least one triggering condition affecting the at least one enterprise computing system, the at least one computer application, or the combination thereof.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 3 is a block diagram illustrating operational steps for providing automatic streamline alerting by integrating source of truths, in accordance with one or more embodiments of the present disclosure.

DETAILED DESCRIPTION

Figure 1:
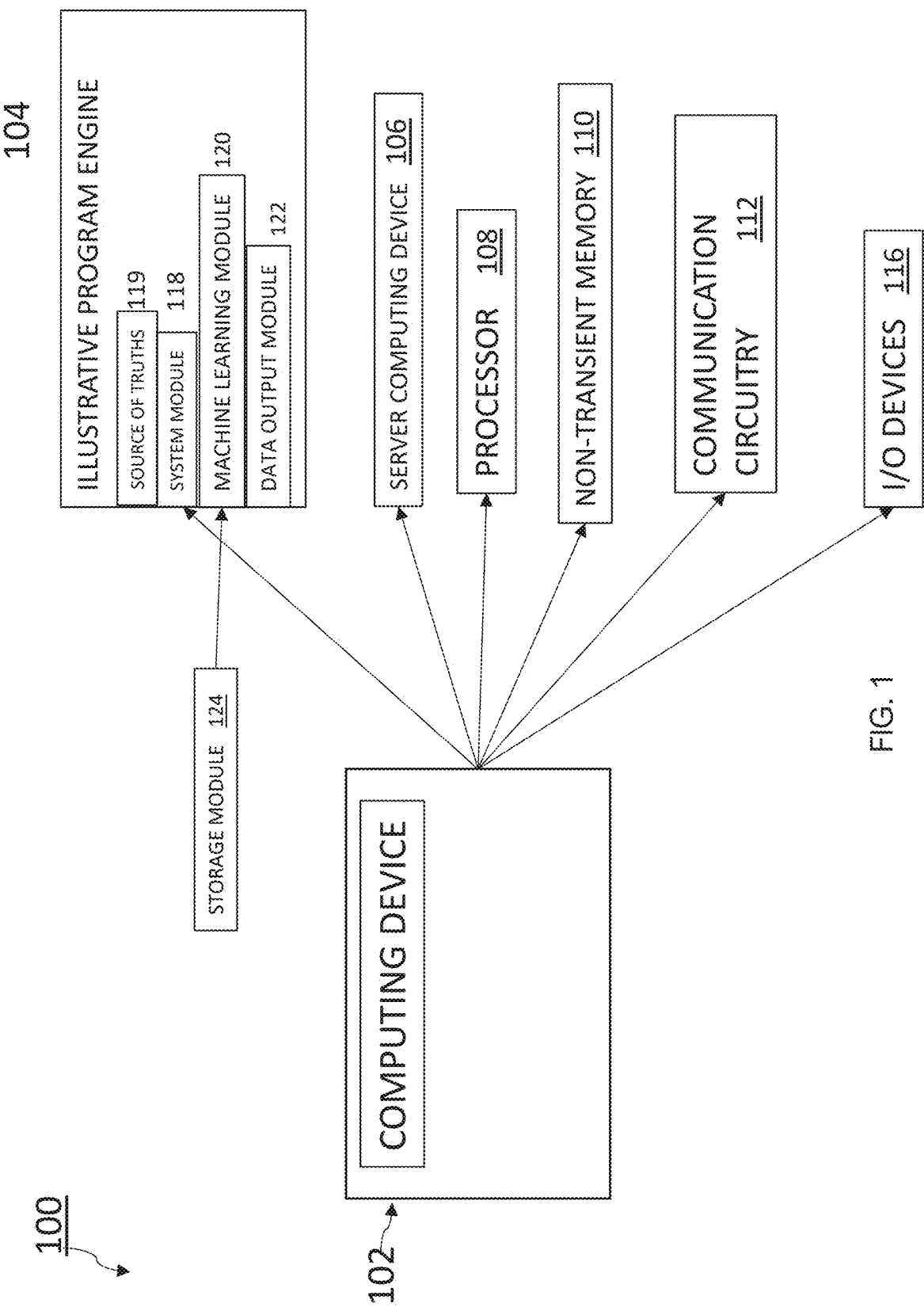
FIG. 1 depicts a block diagram of an exemplary computer-based system and platform for providing automatic streamline alerting by integrating source of truths, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in certain embodiments," "in another embodiment," and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

At least some embodiments of the present disclosure provide technological solution(s) to at least one technological computer-centered problem associated with effectively providing alerts in response to detection of anomalies or incidents relating to enterprise computing systems and applications, and effectively resolving such incidents. Typically, the problem arises when an enterprise computing system or application experiences an anomaly, a malfunction, a failure, or other incident that disrupts business operations and work. For example, an entity, such as a business, may experience a disruption to the business's enterprise computing system that provides human resource functionality, customer relationship management functionality, and/or other functionality to the employees of the business and to facilitate the operations of the business. In order to resolve or minimize the impact of the disruption, existing technologies often involve transmitting an incident alert to notify appropriate parties to act. For example, a business may transmit an alert to a third party vendor outside the business, which maintains the various configurations and mappings to a business application (or enterprise system) and the teams or individuals that can potentially take action to resolve the disruption. Generally, there is limited leeway in setting up the configurations and mappings with the third party vendor, which often leads to the third party vendor sending alerts to a team or individual to resolve a detected disruption that is unavailable or out of the office. Additionally, the configurations, mappings, and other information maintained by the third party vendor are often not up to date or have the requisite quality and accuracy levels to operate effectively. Furthermore, the third party vendor may repeatedly contact the same teams and individuals over and over again, which may lead to fatigue for such individuals and teams. Moreover, existing systems may notify or dispatch the wrong individuals and teams for the specific type of disruption that is occurring. Based on at least the foregoing, existing technologies that provide alerting for enterprise computing system and/or computer application disruptions can result in longer enterprise computing system and/or application downtimes, potentially incorrect actions to resolve disruptions, and utilizing lower quality data when determining how to respond to disruptions. These technological computer-centered problems may result in insufficient disruption resolution, worker fatigue, and increased costs for the business.

As detailed in at least some embodiments herein, at least one technological computer-centered solution addressing the technological computer-centered problem may be to utilize automatic streamline alerting by utilizing integrated source of truths to provide enhanced alerting capabilities, reduce potential disruption downtime, reduce worker fatigue, and optimize disruption resolution capabilities. In certain embodiments, a source of truths can be a system including one or more data sources that provide data to a central repository within a computing system that contains reliable and up-to-date data associated with an enterprise computing system, application, and/or the business controlling the enterprise system and/or application. In certain embodiments, the present disclosure details that one practical solution may be to integrate the source of truths with the system for which the alerting and disruption resolution is to be performed. In certain embodiments, the source of truths can be integrated with a system of the business that is directly connected to the system for which the alerting and disruption resolution is to be performed. At least one embodiments of the technological computer-centered solution can include utilizing a system that includes a memory that stores instructions and a processor that executes the instructions to configure the processor to perform certain operations. For example, in certain embodiments, the system can be configured to detect one or more triggering conditions affecting an enterprise computing system, a computer application, or a combination thereof. The system can be configured to execute, in response to the one or more triggering conditions, an automated action via the system to attempt to resolve the one or more triggering conditions. Additionally, the system can be configured to access the source of truth system to obtain data comprising one or more mappings between each responder of a plurality of responders and the enterprise computing system, the computer application, or the combination thereof. Furthermore, the system can be configured to generate, based on the data and by utilizing an artificial intelligence model, a prediction associated with a schedule for one or more responders of the plurality of responders to resolve the one or more triggering conditions affecting the enterprise computing system, the computer application, or the combination thereof. In certain embodiments, the prediction made by the system can be based on the one or more mapping in the data. Moreover, the system can be configured to transmit, based on the prediction and if the automated action via the system fails to resolve the at least one triggering condition, a notification to the at least one responder in accordance with the schedule to resolve the at least one triggering condition affecting the at least one enterprise computing system, the at least one computer application, or the combination thereof. Based on at least the foregoing functionality and/or other functionality described in the present disclosure, disruptions and/or incidents that affect enterprise computing systems and/or applications can be mitigated in terms of severity, cost, resources expended, downtime, among other benefits. The systems of the present disclosure also reduce responder fatigue and distribute alerts in a fair fashion, while simultaneously enhancing disruption resolution.

FIG. 1 depicts a block diagram of an exemplary computer-based system and platform for providing automatic streamline alerting by integration of source of truths, in accordance with one or more embodiments of the present disclosure.

In certain embodiments, an illustrative computing system 100 of the present disclosure may include at least one computing device 102 associated with at least one user and an illustrative program engine 104. In certain embodiments, the illustrative program engine 104 may be stored on the computing device 102. In some embodiments, the illustrative program engine 104 may be executed on the computing device 102 or a server computing device 106, a processor 108 to perform operations of the system 100, a non-transient memory 110 configured to store data, commands, and/or instructions, a communication circuitry 112 for facilitating and/or enabling communication over a communication network 114 (not shown), and input and/or output (I/O) devices 116 such as a keyboard, mouse, a touchscreen, and/or a display, for example. In certain embodiments, the computing device 102 may refer to at least one communicative computing device of a plurality of communicative computing devices. In certain embodiments, the server computing device 106 may be an external data source that is considered hardware. In certain embodiments, the server computing device 106 may consist of a plurality of software engines to perform a variety of actions. In certain embodiments, the computing device 102 may be considered the server computing device 106. For example, the computing device 102 may be a digital credit card, a smart credit card, a smart phone, a mobile device, a wearable device, a computer, a sensor, and/or a laptop. In certain embodiments, the computing device 102 may have an ability to execute a plurality of actions, such as, but not limited to, detecting triggering conditions that may be affecting an enterprise computing system and/or application, executing automated actions to attempt to resolve the triggering conditions that have been detected, accessing a source of truths containing data that includes mappings between responders and the enterprise computing system and/or application (e.g., mapping between skill sets of responders to effectively interact with the enterprise computing system and/or application, mappings between availability of responders to interact with the computing system and/or application, and/or other types of mappings described herein), generating, such as by utilizing an artificial intelligence model, a prediction for a schedule associated with one or more responder to resolve the triggering conditions, determining resolution steps or actions for the responder(s) to perform on the enterprise computing system and/or application, transmitting notifications to the responders in accordance with the schedule to resolve the triggering conditions, such as by utilizing the resolution steps or actions, facilitating resolution of the triggering conditions, training artificial intelligence models based on predictions, feedback, and/or other data, performing any other actions of the present disclosure, or a combination thereof. In certain embodiments, the server computing device 106 may utilize software engines to perform the plurality of actions.

In some embodiments, the illustrative program engine 104 may be configured to instruct the processor 108 to execute one or more software modules such as, without limitation, an exemplary system module 118, a source of truths 119 (which can also be located anywhere else in the computing system 100, the system 400, and/or the system 400), a machine learning module 120, a data output module 122, and/or any other modules, programs, and/or functions. Notably, any of the modules of the illustrative program engine 104 can perform any of the functionality of the present disclosure and can cooperate with each other to perform any of the functionality or can perform any of the functionality individually.

In certain embodiments, an exemplary system module 118 of the present disclosure may be configured to detect triggering conditions that can affect an enterprise computing system and/or application. In certain embodiments, the system module 118 can be software, hardware, or a combination of software and hardware. In certain embodiments, a triggering condition can be, but is not limited to, an anomaly associated with the enterprise computing system and/or application (e.g., the enterprise computing system and/or application is behaving in an unexpected manner, functionality performed by the enterprise computing system and/or application is not operating as programmed or expected, different than expected functionality is being performed by the enterprise computing system and/or application, the enterprise computing system and/or application is be used in an unexpected or restricted manner; and/or other anomalies), detection of a failure associated with functionality of the enterprise computing system and/or application, detection of a virus and/or hack for the enterprise computing system and/or application, detection of an upcoming maintenance and/or update required or recommended for the enterprise computing system and/or application, detection of an unauthorized access of the enterprise computing system and/or application, any other triggering condition, or a combination thereof. In certain embodiments, the system module 118 may be configured to contain and/or utilize any number of functions, such as automated action functions that can be utilized to perform actions to attempt to resolve triggering conditions detected by the system module 118. In certain embodiments, the system module 118 can be configured to determine the automated action to perform based on the type of triggering condition detected and execute the automated action. For example, if the triggering condition is a failure of the enterprise computing system relating to email functionality, the system module 118 can determine that the automated action to perform to resolve the failure of the email functionality is to automatically download a software patch that provides an update to the email functionality and install it.

In certain embodiments, once the automated action is executed or at any other desired times, the system module 118 can access the source of truths 119 of the computing system 100 to obtain data, such as, but not limited to, data including mappings between responders that can respond to an incident and the enterprise computing system and/or application. Such mappings can indicate whether a particular responder is qualified to interact with and/or resolve triggering conditions detected by the computing system 100. In certain embodiments, the source of truths 119 can be a database or system that serves as a central repository within a computing system (e.g., computing system 100) that contains reliable and up-to-date data associated with an enterprise computing system and/or application. In certain embodiments, the source of truths can include any type of information associated with a business (e.g., responder schedules, responder skill sets, onboarding and/or off boarding of employees/responder information, enterprise computing system status information, application status information, application feature information, enterprise computing system feature information, responder team information (e.g., what team a responder is on and the composition of the team), contact information for responders (e.g., email, phone, messenger handles, etc.), human resource information, calendar information for each responder, historical incident information affecting enterprise computing systems and/or applications, information regarding resolution steps and/or actions to resolve triggering conditions, information on triggering conditions, any other information, or a combination thereof) and/or as otherwise described herein.

In certain embodiments, the system 100 can utilize at least one trained machine learning module 120 (and/or other type of artificial intelligence module), described herein, to utilize machine learning models (and/or other type of artificial intelligence model) to accurately predict schedules for responders to respond to triggering conditions affecting the enterprise computing system and/or application. In certain embodiments, the at least one trained machine learning module 120 can analyze the data obtained from the source of truths 119 to predict the schedule and identify one or more responders to resolve the triggering condition. In identifying the one or more responders, the machine learning module 120 can factor in on-call frequency of each responder (i.e., how often the responder has been on call and/or has been deployed to resolve a triggering condition), availability of a responder (i.e., whether the responder is available or not), capability of a responder (i.e., can the responder resolve the triggering condition either based on prior experience with a similar triggering condition and/or based on skill set), the schedule of the responder, the type of triggering condition, human resource information, contact methods for the responder (e.g., phone, email, satellite, computer, etc.), whether the responder has been on-boarded or is being off-boarded, information relating to prior resolutions of prior incidents and/or disruptions and how the resolution was effective, the effectiveness of the responder in resolving prior triggering conditions, any other information, or a combination thereof.

In certain embodiments, the system 100 can utilize the machine learning module 120 to determine one or more resolution steps and/or actions for the one or more responders to facilitate the responders in resolving the triggering condition affecting the enterprise computing system and/or application. For example, the machine learning module 120 can determine the resolution steps and/or actions based on prior effectiveness of the resolution steps and/or actions in resolving the same or similar triggering condition on a prior condition, based on known resolution steps and/or actions provided by a provider of one or more software functionality of the enterprise computing system and/or application, based on a prediction made by the module based on the characteristics of the triggering condition, based on other factors and/or information, or a combination thereof. In certain embodiments, the machine learning module 120 can transmit a notification to the one or more responders from the predicted schedule that the system 100 selects. In certain embodiments, the notification can include an identification of the triggering condition, a current status of the enterprise computing system and/or application, whether resolution steps have alleviated some of the disruption caused by the triggering condition, resolution steps and/or actions of the responders to use to attempt to resolve the triggering condition, or a combination thereof. The responder and/or the computing system 100 can work individual or in combination with each other to resolve the triggering condition and effects on the enterprise computing system and/application.

If the triggering condition is resolved based on the resolution steps and/or actions recommended by the computing system 100 and/or responders, information relating to the resolution of the triggering action can be fed back to train the machine learning module's 120 models to enhance future predictive capabilities. Additionally, if the triggering condition is not resolved based on the resolution steps and/or actions, the system 100 can generate additional potential resolution steps and/or actions and/or the responder(s) can perform their own separate resolution steps and/or actions until the triggering condition and effects on the enterprise computing system and/or application are resolved. All data generated based on operation of the computing system 100 can be utilized to train the machine learning models of the machine learning module 120 to facilitate enhanced and optimized performance so that the next time a triggering condition(s) is detected, the performance of the computing system 100 in resolving triggering conditions and the effects of triggering conditions is improved.

In certain embodiments, the present disclosure describes systems for utilizing the machine learning module 120 to facilitate and/or perform any of the operations of the computing system 100. For example, the machine learning module 120 can utilize neural networks, support vector machines, logistic regressions, linear regressions, regression analysis, statistical classification, cluster analysis, artificial intelligence, and/or other forms of machine learning to perform all of the operative functions of the systems and methods described herein. In some embodiments, the non-transient computer memory 110 may store an output of an operation performed by the computing device 102. In certain embodiments, the output may refer to performing the operation and/or generating instructions to execute operation of the detection functions, prediction functions, training functions, and/or performing other operations. In certain embodiments, the non-transient computer memory 110 may store data associated with accessing the source of truths 119, executing automated actions, generating predictions for schedules for responders that can potentially resolve the triggering conditions and/or effects of the triggering conditions, determining resolution steps, transmitting notifications to responders to resolve the triggering conditions, training the artificial intelligence models, store any other information described in the present disclosure, or a combination thereof. In some embodiments, the non-transient computer memory 110 may store any of the data received and/or generated by the computing system 100 in a storage module 124 associated with the computing device 102 with metadata based on a transmission of data in response to the execution of operations of the system 100. In certain embodiments, the non-transient computer memory 110 may store predictions, information relating to resolution steps and/or actions, any other information traversing the system 100, or a combination thereof.

Figure 2:
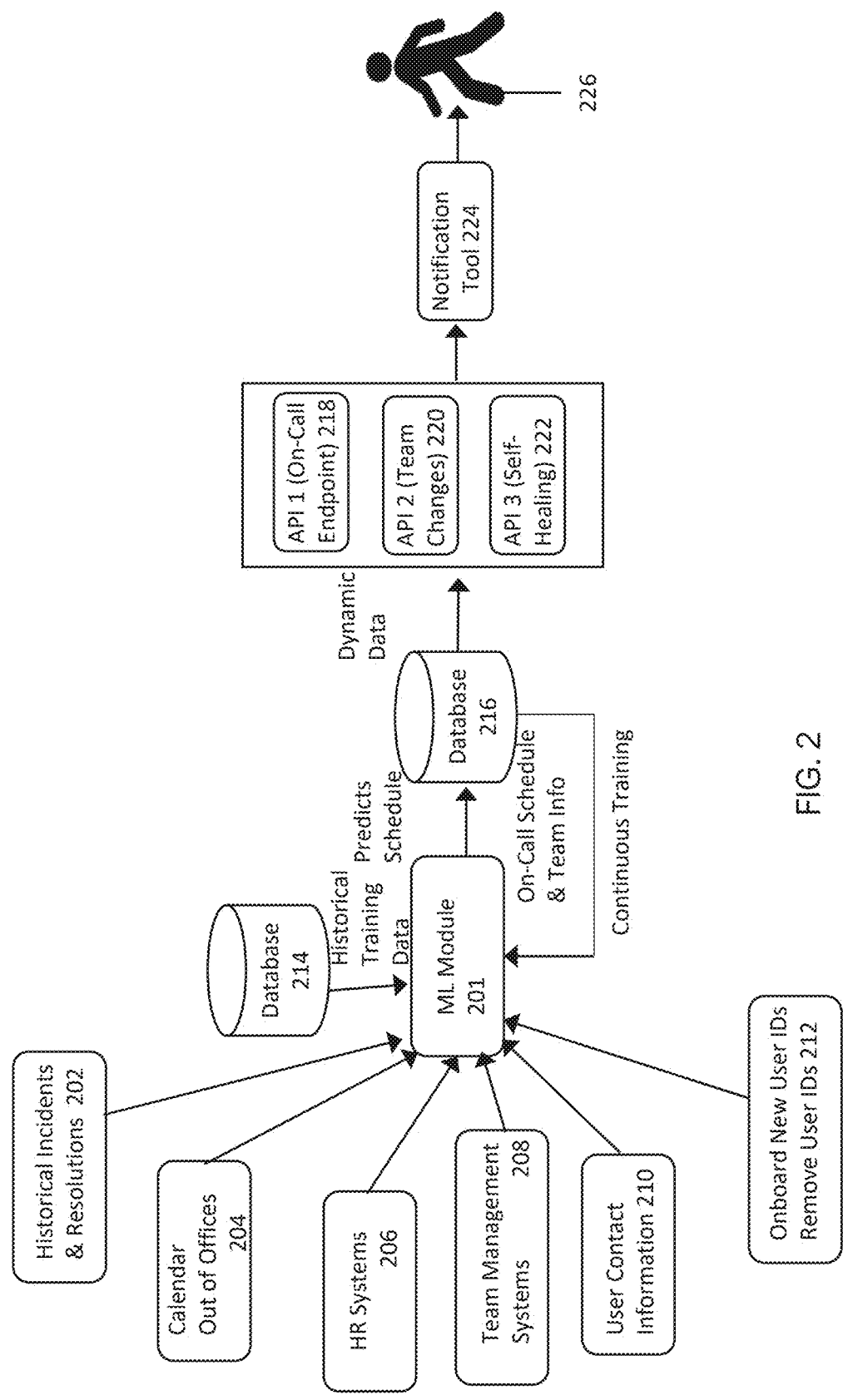
FIG. 2 is a block diagram illustrating a schematic diagram of a process flow of an exemplary computer-based system and platform for providing automatic streamline alerting by integrating source of truths, in accordance with one or more embodiments of the present disclosure, and which can be utilized with the system of FIG. 1.

FIG. 2 is a block diagram illustrating a process flow 200 for providing automatic streamline alerting by integrating source of truths, in accordance with one or more embodiments of the present disclosure.

At 202, 204, 206, 208, 210, 212, and 214 of the process flow 200, the machine learning model 210 (e.g., machine learning module 120 or other components of computing system 100), which may be within the computing device 102 or otherwise, can be configured to receive data from data sources. Such data sources can include, but are not limited to, historical incident and resolution information (e.g., information describing incidents and information describing resolutions that resolve the incidents or failed at resolving the incidents, etc.), calendar and/or out-of-office information for responders (e.g., employees), human resource system information (e.g., demographic information, name information, benefits information, emergency contact information, capability and/or skillset information, etc.), team management system information (e.g., what teams each responder is on, the capabilities of each team, how often the team is deployed, etc.), user contact information (e.g., phone number, email address, social media handles, messenger handles, etc.), user identifiers unique identifying responders (e.g., such as given during onboarding of a new employee), whether a user identifier has been removed for a responder (e.g., if the responder is leaving the company or has been terminated from the position), any other information, or a combination thereof. In certain embodiments, at 214, the database can provide historical training data to train the machine learning module 201 to perform predictions for schedules for responders to resolve triggering conditions and/or effects of triggering conditions affecting an enterprise computing system and/or application. At 216, another database can provide on-call schedules of responders and additional team information that can be utilized to continuously train the machine learning module 201 in real-time.

The machine learning module 201 can predict schedules dynamically and provide the dynamic data associated with the predictions and/or real-time data associated with triggering conditions to one or more systems and/or application programming interfaces to facilitate resolution of the triggering conditions and/or their effects. For example, the predictions and/or dynamic data can be provided to an API 218 that serves as an on-call endpoint that can connect the computing system 100 to a responder 226. As another example, the predictions and/or dynamic data can be provided to API 220 to provide team updates and/or changes to existing teams or to create new teams of responders. As a further example, the predictions and/or dynamic data can be provided to an API 222, which can utilize the information to conduct self-healing on the enterprise computing system and/or application. For example, self-healing can include performing automated actions in response to the detection of the type of triggering condition that is occurring and the disruptions that have occurred and/or can occur. At 224, a responder(s) can be notified to respond to the triggering condition and/or triggering condition effects to resolve the triggering condition and/or effects if the automated actions conducted by the computing system 100 do not fully resolve the conditions or effects.

In certain embodiments, the machine learning module 201 can learn from past incidents and prior predictions to enhance prediction capabilities over time. In certain embodiments, the system 100 can also be configured to execute one or more automated actions, such as via a computer system capable of fixing or resolving incidents, to attempt to resolve the incident and/or condition prior to notifying the one or more responders. In certain embodiments, the system 100 and methods can also generate predictions to ensure that requests to resolve incidents are distributed in a fair and appropriate manner to avoid overloading certain responders over others. In certain embodiments, the system can dynamically add or remove users from the schedule, such as based on data from the source of truth system 119.

FIG. 3 is a flowchart of a method 300 illustrating operational steps for providing automatic streamline alerting by integrating source of truths, in accordance with one or more embodiments of the present disclosure.

In step 301, which can be an optional step, the illustrative program engine 104 (or other components) can train an artificial intelligence model(s) to generate predictions. In certain embodiments, for example, one or more artificial intelligence models can be trained using historical data, other types of training data, or a combination thereof, to perform predictions associated with schedules for one or more responders that can potentially resolve a triggering condition that can affect an enterprise computing system, application, or a combination thereof. In certain embodiments, the historical data and/or training data can include, but is not limited to, historical information and/or training data associated with any number of responders (e.g., responder presence information, digital calendar information, attendance of each responder at the business, out-of-office notifications and/or messages, information relating to the skill sets and/or training of the responders, information relating to prior resolution of triggering conditions by a responder, any other information described in the present disclosure, or a combination thereof). In certain embodiments, the training data can also include labeled data that indicates whether a particular responder is available at a particular time or not, has a requisite skill set or not, has been utilized to resolve a triggering condition recently (e.g., within a threshold number of days, weeks, months, etc.), whether a responder has been successful in resolving a condition or not, any other types of labels for data, or a combination thereof. In certain embodiments, the artificial intelligence model(s) can also be trained to determine resolution steps for potentially resolving a triggering condition, such as by training the models based on whether a particular resolution step was effective in resolving a triggering condition in the past or not. In certain embodiments, the artificial intelligence model(s) do not have to be trained at the outset and can be trained periodically or continuously after the first iteration of the method 300, such as via reinforcement learning, which can penalize or reward the model(s) based on the accuracy of the predictions made by the model(s).

In step 302, the illustrative program engine 104 (or other components) within the computing device 102 can detect a triggering condition (or multiple triggering conditions) affecting an enterprise computing system and/or an application. In certain embodiments, the triggering condition can be, but is not limited to, an anomaly associated with the enterprise computing system and/or application (e.g., the enterprise computing system and/or application is behaving in an unexpected manner, functionality performed by the enterprise computing system and/or application is not operating as programmed or expected, different than expected functionality is being performed by the enterprise computing system and/or application, the enterprise computing system and/or application is be used in an unexpected or restricted manner; and/or other anomalies), detection of a failure associated with functionality of the enterprise computing system and/or application, detection of a virus and/or hack for the enterprise computing system and/or application, detection of an upcoming maintenance and/or update required or recommended for the enterprise computing system and/or application, detection of an unauthorized access of the enterprise computing system and/or application, any other triggering condition, or a combination thereof. In certain embodiments, the detection of the triggering condition can be performed by any components of the computing system 100, such as the program engine 104, any other components of the present disclosure and/or as shown in the Figures, or a combination thereof.

In certain embodiments, the triggering condition can be detected and/or classified by utilizing an artificial intelligence model, such as a machine learning model. In certain embodiments, the machine learning model can be trained based on labeled data that indicates that certain actions that happen with respect to an enterprise computing system and/or application, certain behaviors of the enterprise computing system and/or application, certain occurrences that occur with respect to the enterprise computing system and/or application, lack of certain capabilities of the enterprise computing system and/or application, certain interactions conducted by programs and/or devices with the enterprise computing system and/or application, can correspond to certain types of triggering conditions. In certain embodiments, the trained machine learning model can detect and/or identifying the triggering condition by scanning and/or analyzing the enterprise computing system and/or application for current data and comparing the data to the training data to determine the presence of a triggering condition and/or the type of triggering condition. In certain embodiments, the computing system 100 (and/or other systems) can utilizing any type of artificial intelligence techniques and/or algorithms to facilitate the determination. Such techniques can include machine learning (e.g., supervised machine learning, unsupervised learning, semi-supervised learning, reinforcement learning, etc.), deep learning, natural language processing, computer vision (e.g., object detection, image classification, image segmentation, etc.), pattern-detection techniques, any other types of techniques and/or algorithms, or a combination thereof.

In step 304, the illustrative program engine 104 (or other components) can execute an automated action to attempt to resolve the triggering condition affecting the enterprise computing system and/or application. In certain embodiments, the illustrative program engine 104 (or other components) can identify one or more automated actions to perform based on identifying the triggering condition affecting the enterprise computing system and/or application. For example, the illustrative program engine 104 (e.g., via the system module 118) can determine that the triggering condition is that a specific function of the application has failed. In response, the illustrative program engine 104, based on identifying the function that has failed, can execute an automated action that includes attempting to update the specific function with a new version of the function, attempt to apply a software patch to fix the function, attempt to rewrite the code supporting the function and recompiling the application, perform other types of automated actions, or a combination thereof.

Once the automated action is performed or at any other desired time, the method 300 can include accessing a source of truths to obtain data at step 306. In certain embodiments, a source of truths can be a database that serves as a central repository within a computing system (e.g., computing system 100) that contains reliable and up-to-date data associated with an enterprise computing system and/or application. In certain embodiments, the source of truths can include any type of information associated with a business including, but not limited to, historical incident data associated with the enterprise computing system and/or application (e.g., history of failures, history of anomalies, etc.), human resource information (e.g., identifies and/or demographic information of employees, benefits information, insurance information, etc.), user contact information (e.g., email address, phone numbers, identifiers that identify employees of the business, emergency contact information, etc.), information indicating user identifiers (e.g., business email addresses, other types of unique identifiers, etc.) of new employees, information indicating whether an employee has left and the identifier has been removed, information indicating that a particular employee is being on-boarded in the business or being off-boarded, information indicating the roles of each employee and capabilities of each employee (e.g., a particular employee is familiar with fixing triggering conditions associated with a particular version of an application and/or the enterprise computing system, the types of job roles the employee performs, the certifications of the employee, the education of the employee, etc.), the hiring date of the employee, the termination date of the employee, information identifying out-of-office information (e.g., online calendars that indicate out-of-office information and/or in-office information for each employee, information obtained from user devices of the employees, information obtained from text messages and/or chat applications utilized by the employees, etc.), any other information associated with an employee and/or the business, or a combination thereof. In certain embodiments, any type of source of truths can be accessed including, but not limited to, databases, applications, software programs, hardware devices (e.g., cache of processor, memory devices, flash drives, hard drives, etc.), any other types of source of truths, or a combination thereof. In certain embodiments, the source of truths (or sources of truths) can be integrated into the computing system 100, the computer-based system/platform 400, the computer-based system/platform 500, any other system, or a combination thereof. By integrating the source of truths within the computing system instead of a third-party system or vendor, the data contained within the source of truths can have higher accuracy, provide greater transparency, have higher quality data, more recent updates to data, or a combination thereof.

In certain embodiments, once the data from the sources of truths is accessed, the method 300 can proceed to step 308. At step 308, the illustrative program engine 104 can generate a prediction for a schedule for one or more responders to resolve the one or more trigger. In certain embodiments, the prediction can also be to predict which specific responder(s) should be selected for resolving the triggering condition. In certain embodiments, the prediction can be performed and/or generated by utilizing any number of artificial intelligence models, such as machine learning models. In certain embodiments, the prediction of the schedule for the one or more responders can be generated by a machine learning model by analyzing the data from the source of truths. The machine learning model(s) can be trained using training data that includes data from the source of truths obtained on prior occasions and/or other training data. In certain embodiments, the training data can include labeled training data that can include labels on data that indicate that a particular responder (e.g., IT employee) is capable of resolving a particular triggering condition or not, that a particular responder is available during a certain period of time, that a particular responder has a certain level of education, that a responder is not capable of resolving a particular triggering condition, any other labeled data, or a combination thereof. In certain embodiments, training data can also be utilized to training the machine learning model to perform the prediction for the schedule for the responders, such as by training the machine learning model using algorithms to generate predictions for schedules. In certain embodiments, the predictions can be made by comparing patterns in the data to patterns known by the machine learning model to be correlated with a particular aspect of a schedule and/or responder, or a combination thereof.

In certain embodiments, the prediction for the schedule can include identifying a time of availability and one or more responders that are capable of resolving the triggering condition affecting the enterprise computing system and/or application. In certain embodiments, the prediction can be adjusted based on how recently a particular responder responded to a triggering condition (e.g., selecting an alternative responder instead of an initially selected responder to avoid over fatiguing the initially selected responder), how often a responder is selected by the machine learning model to resolve a triggering condition, achieving fairness of selection among responders, whether a particular responder is still employed or not employed by the business, based on presence information for a responder (e.g., current status on a messenger application, such as away or present), based on digital notes provided by a responder (e.g., that the responder will be away for a period of time or is available), any other contextual information, or a combination thereof.

At step 310, the method 300 can include determining one or more resolution steps or actions for the one or more responders from the predicted schedule to perform to resolve the one or more triggering conditions affecting the enterprise computing system and/or the application. In certain embodiments, the one or more resolution steps or actions can be steps or actions that can be performed by one or more of the responders to resolve the triggering condition, alleviate the triggering condition, reduce a severity of the triggering condition, and/or adjust other aspects of the triggering condition, or a combination thereof. In certain embodiments, the computing system 100, such as by utilizing the artificial intelligence model (e.g., machine learning model), can determine the resolution steps or actions based on analyzing previously conducted resolution steps or actions conducted by responders and that were effective in resolving one or more triggering conditions that are the same or have a threshold level of similarity to the current one or more triggering conditions. As examples, resolution steps and/or actions that can be determined by the computing system 100 can be a step requesting activation of a higher level of an antivirus program (e.g., if the triggering condition is detection of malware), reboot the enterprise computing system and/or application, execute another application or system to initiate resolution of an anomaly, requesting that the user conduct a sequence of steps with respect to the enterprise computing system and/or application, disabling certain functionality of the enterprise computing system and/or application, activating certain functionality of the enterprise computing system and/or application, writing code to serve as a patch for the enterprise computing system and/or application, any other resolutions steps and/or triggering conditions.

Once the one or more resolution steps and/or actions are determined and/or predicted, the method 300 can proceed to step 312. At step 312, the method 300 can include transmitting a notification to the one or more responders available based on the predicted schedule that indicates the resolution step(s) and/or actions that the one or more responders should perform. In certain embodiments, the computing system 100 can be configured to transmit a signal including the indication of the resolution steps and/or actions to a device of one or more of the responders. In certain embodiments, the notification can instruct the one or more responders to conduct the resolution step and/or action on the enterprise computing system and/or application. At step 314, the method 300 can include training the artificial intelligence model (e.g., machine learning model) based on the predictions performed, an accuracy of the predictions (e.g., by comparing the predicted schedule to an actual schedule and/or whether the resolution step and/or actions were successful or not, feedback (e.g., feedback by the first user 101 relating to the resolution of the triggering condition), based on the determinations, based on any other information generated by the systems of the present disclosure, or a combination thereof. Notably, the method 300 can be repeated as desired as new triggering conditions are detected.

Figure 4:
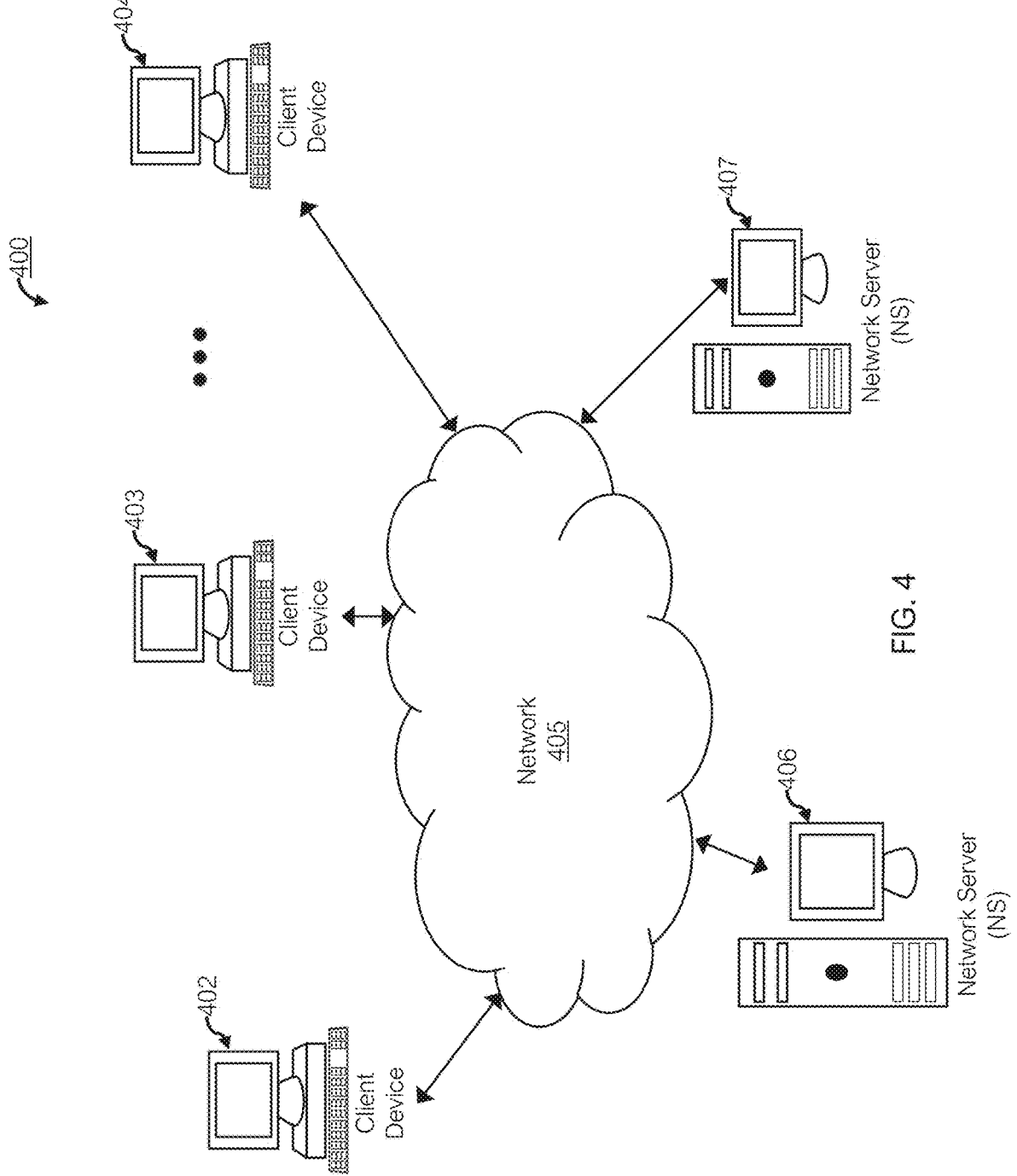
FIG. 4 depicts a block diagram of exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In certain embodiments, the exemplary inventive computing devices and/or the exemplary inventive computing components of the exemplary computer-based system/platform 400 may be configured to provide automatic streamline alerting by integrating source of truths with the computer-based system/platform 400, as detailed herein. In certain embodiments, the exemplary computer-based system/platform 400 may be based on a scalable computer and/or network architecture that incorporates various strategies for providing automatic streamline alerting that utilizes integrated source of truth information. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary system module 118 of the present disclosure, such as by utilizing at least one machine-learning model described herein.

In certain embodiments, referring now also to FIG. 4, members 402-404 (e.g., client) of the exemplary computer-based system/platform 400 may include virtually any computing device capable of generating, transmitting, and/or receiving streamline alerts (and/or performing any other operations of the present disclosure) via a network (e.g., cloud network), such as network 405, to and from another computing device, such as servers 406 and 407, each other, and the like. In certain embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary system module 118 of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In certain embodiments, the exemplary network 405 may provide network access, data transport and/or other services to any computing device coupled to it. In certain embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In certain embodiments, the exemplary network 405 may include and implement, as an alternative or in conjunction with one or more of the above, a WiMAX architecture defined by the WiMAX forum. In certain embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In certain embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In certain embodiments, the exemplary server 406 or the exemplary server 407 may be a web server (or a series of servers) running a network operating system, examples of which may include but are not limited to Microsoft Windows Server, Novell NetWare, or Linux. In certain embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as queuing servers, authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In certain embodiments and, optionally, in combination of any embodiments described above or below, for example, one or more exemplary computing member devices 402-404, the exemplary server 406, and/or the exemplary server 407 may include a specifically programmed software module that may be configured to detect one or more triggering conditions affecting one or more enterprise computing systems and/or one or more applications; executing an automated action via a system (e.g., system 100) to attempt to resolve the one or more triggering conditions; accessing a source of truths to obtain data including mappings between responders and the enterprise computing system and/or applications; generating, based on the data and by utilizing an artificial intelligence model, a prediction associated with schedule for one or more responders to resolve the one or more triggering conditions; determining one or more resolution steps or actions for the one or more responders to perform to resolve the one or more triggering conditions; transmitting notifications to the one or more responders in accordance with the schedule to resolve the one or more triggering conditions; training the artificial intelligence model based on the prediction, feedback relating to the prediction, the data, other data, or a combination thereof; and performing any of the other operative functionality described in the present disclosure.

Figure 5:
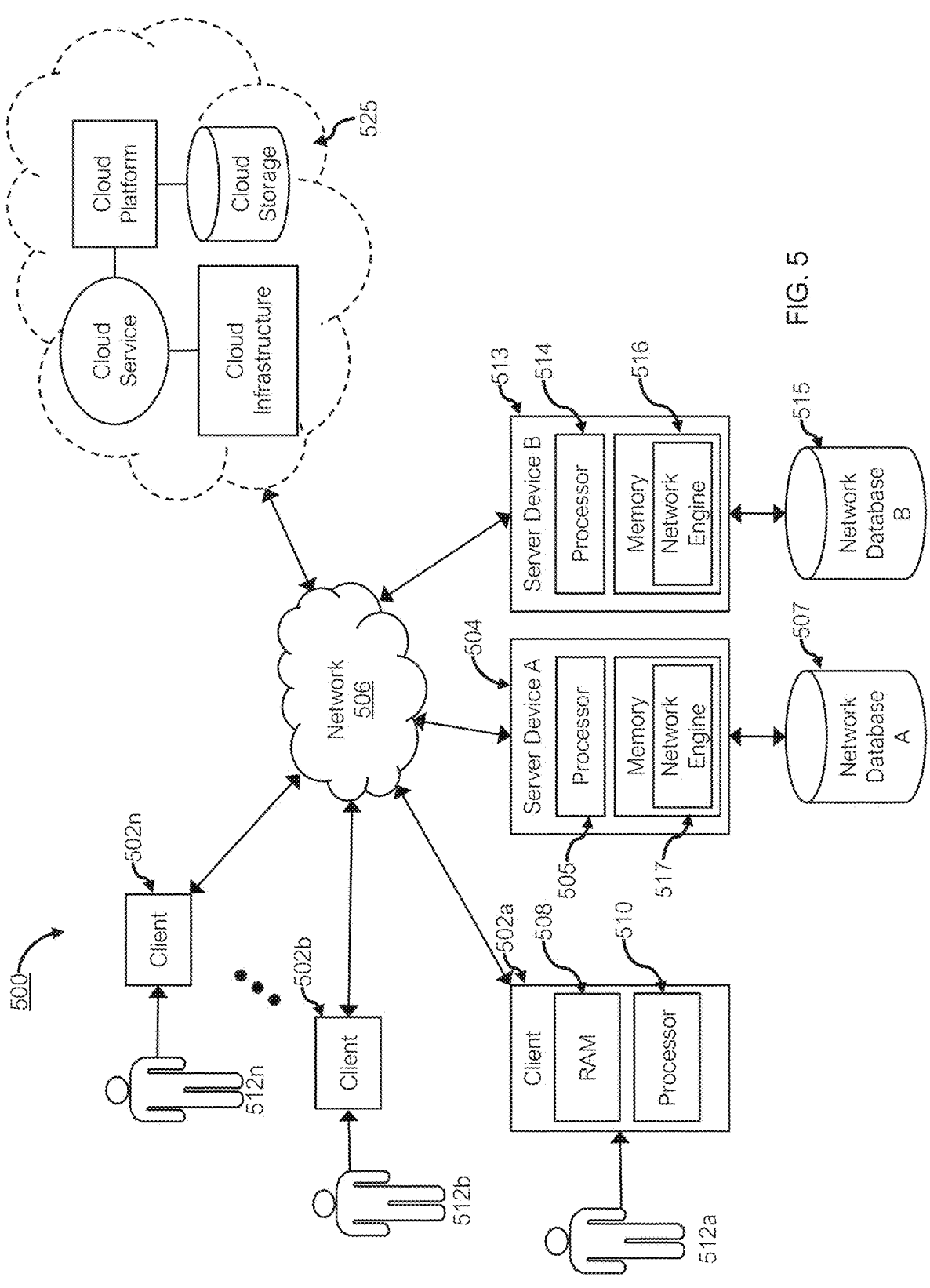
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In certain embodiments, the processor 510 may execute computer-executable program instructions stored in memory 508. In some embodiments, the processor 510 may include a microprocessor, an ASIC, and/or a state machine. In certain embodiments, the processor 510 may include, or may be in communication with, media, for example computer-readable media, which stores instructions that, when executed by the processor 510, may cause the processor 510 to perform one or more steps described herein. In certain embodiments, examples of computer-readable media may include, but are not limited to, an electronic, optical, magnetic, or other storage or transmission device capable of providing a processor, such as the processor 510 of client 502a, with computer-readable instructions. In certain embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In certain embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In certain embodiments, member computing devices 502a through 502n may be specifically programmed with one or more application programs in accordance with one or more principles/methodologies detailed herein. In certain embodiments, member computing devices 502a through 502n may operate on any operating system capable of supporting a browser or browser-enabled application, such as Microsoft™, Windows™, and/or Linux. In certain embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In certain embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In certain embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In certain embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In certain embodiments, the exemplary DBMS-managed database may be specifically programmed to include metadata about the data that is stored.

Figure 6:
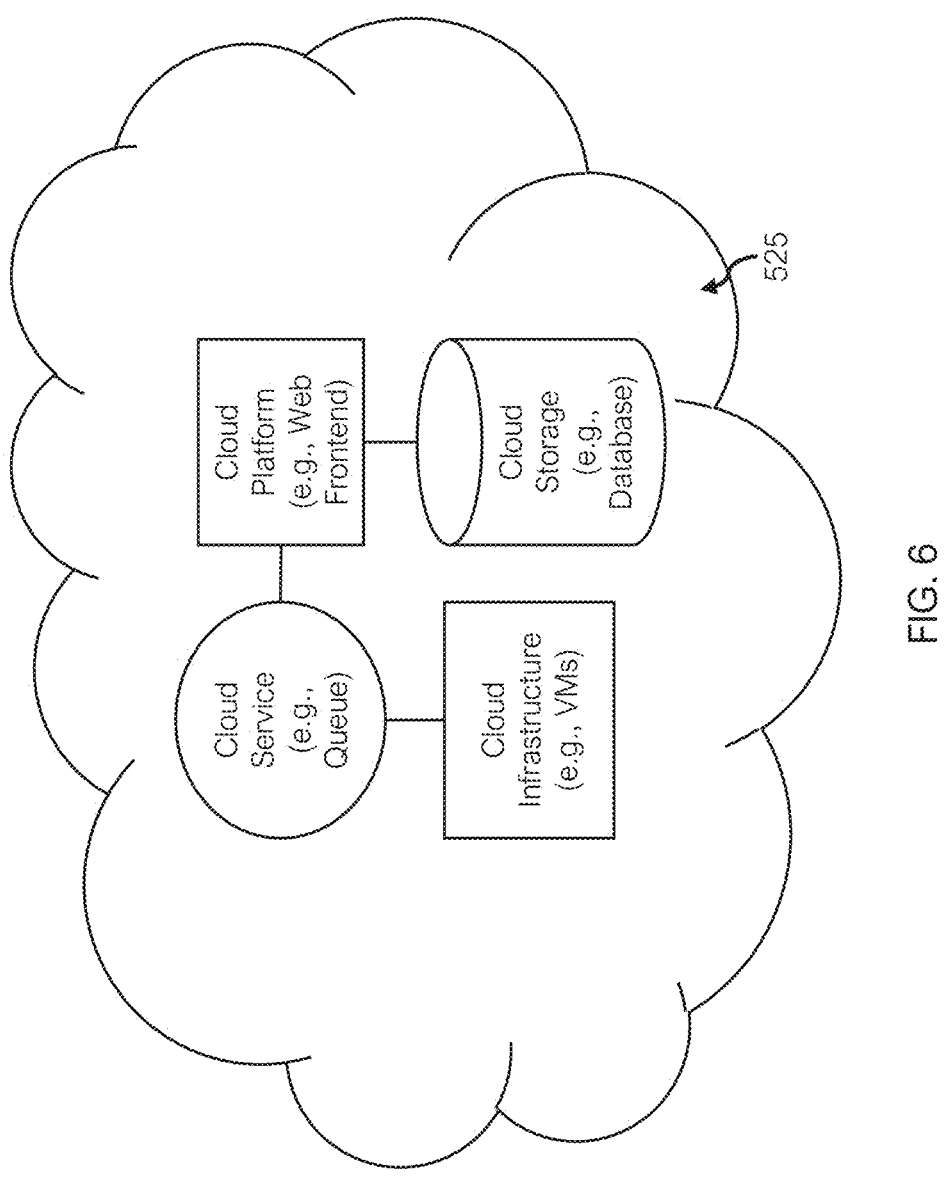
FIGS. 6 and 7 are block diagrams illustrating implementations of cloud computing architecture/aspects with respect to which the disclosed technology may be specifically configured to operate, in accordance with one or more embodiments of the present disclosure.
Figure 7:
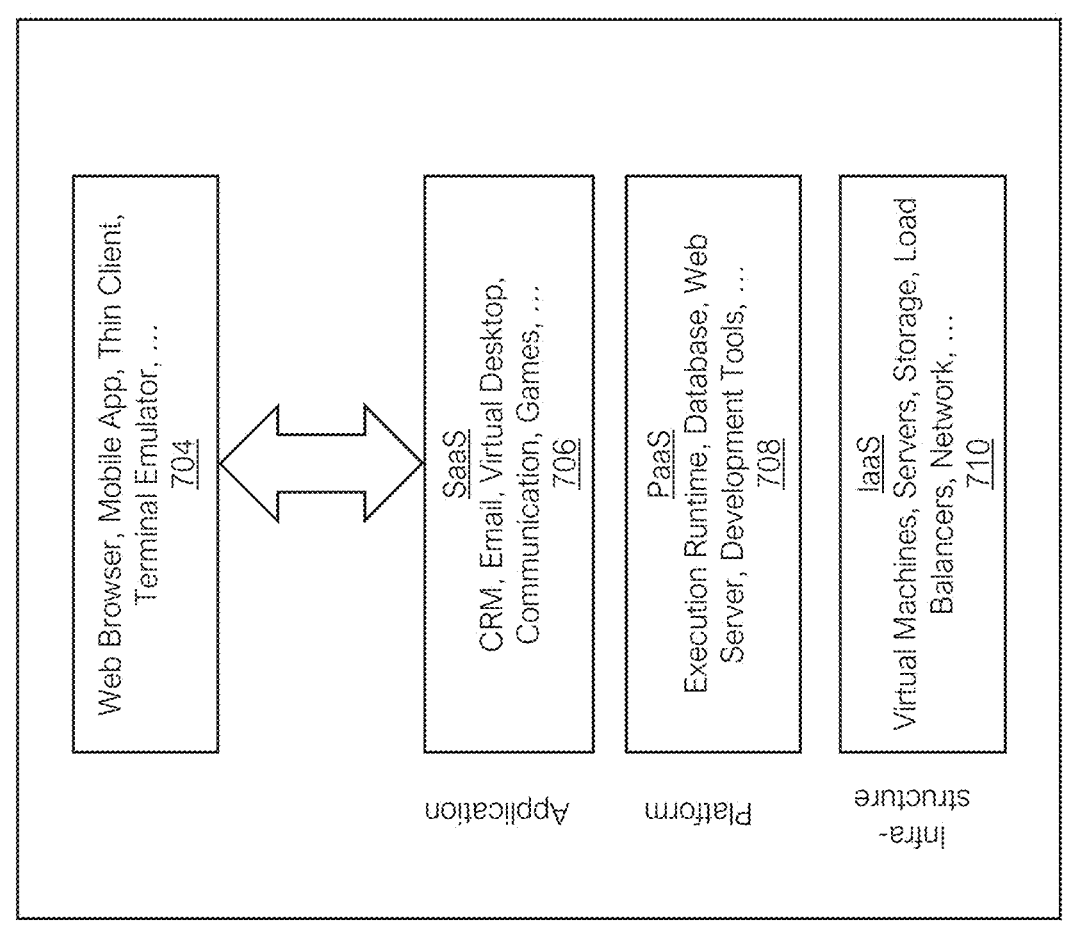

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7, illustrates the exemplary inventive computer-based components of the present disclosure may be specifically configured to operate in the cloud computing/architecture 525 as a source database 704, where the source database 704 may be a web browser, a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS) 710, platform as a service (PaaS) 708, and/or software as a service (SaaS) 706.

In certain embodiments and, optionally, in combination of any embodiment described above or below, an exemplary trained neural network model may be utilized to support the functionality provided by the system 100 and methods, and may specify a neural network by at least a neural network topology, a series of activation functions, and connection weights. For example, the topology of a neural network may include a configuration of nodes of the neural network and connections between such nodes. In certain embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In certain embodiments and, optionally, in combination of any embodiment described above or below, an output of the exemplary aggregation function may be used as input to the exemplary activation function. In certain embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In certain embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In certain embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least certain embodiments, the exemplary ASR system of the present disclosure, utilizing at least one machine-learning model described herein, may be referred to as exemplary software.

In certain embodiments, exemplary inventive computer-based systems/platforms, exemplary inventive computer-based devices, and/or exemplary inventive computer-based components of the present disclosure may be configured to handle numerous concurrent tests for software agents and/or numerous streaming or other types of records that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

At least some aspects of the present disclosure will now be described with reference to the following numbered clauses.

Clause 1. A system may include a memory that stores instructions and a processor that executes the instructions to configure the processor to: detect at least one triggering condition affecting at least one enterprise computing system, at least one computer application, or a combination thereof; execute, in response to the at least one triggering condition, an automated action via the system to attempt to resolve the at least one triggering condition; access a source of truth system to obtain data comprising at least one mapping between each responder of a plurality of responders and the at least one enterprise computing system, the at least one computer application, or the combination thereof; generate, based on the data and by utilizing an artificial intelligence model, a prediction associated with a schedule for at least one responder of the plurality of responders to resolve the at least one triggering condition affecting the at least one enterprise computing system, the at least one computer application, or the combination thereof, wherein the prediction is based at least on the at least one mapping in the data; and transmit, based on the prediction and if the automated action via the system fails to resolve the at least one triggering condition, a notification to the at least one responder in accordance with the schedule to resolve the at least one triggering condition affecting the at least one enterprise computing system, the at least one computer application, or the combination thereof.

Clause 2. The system according to clause 1, wherein the processor is further configured to determine at least one resolution step to recommend to the at least one responder to assist the at least one responder in resolving the at least one triggering condition affecting the at least one enterprise computing system, the at least one computer application, or a combination thereof.

Clause 3. The system according to clause 1 or 2, wherein the processor is further configured to modify the prediction associated with the schedule in real-time based on receiving at least one signal associated with the plurality of responders, wherein the at least one signal provides an update to the data.

Clause 4. The system according to clause 1, 2 or 3, wherein the processor is further configured to dynamically remove or add responders from the plurality of responders as the data from the source of truth system changes over time.

Clause 5. The system according to clause 1, 2, 3 or 4, wherein the processor is further configured to determine that the at least one triggering condition comprises: detection of at least one anomaly associated with the at least one enterprise computing system, the at least one computer application, or a combination thereof, or detection of a failure associated with the at least one enterprise computing system, the at least one computer application, or a combination thereof.

Clause 6. The system according to clause 1, 2, 3, 4 or 5, wherein the processor is further configured to integrate the source of truth system with the system, wherein the source of truth system comprises a team repository, a human resource system, an off-boarding and on-boarding database, historical incidents data, or a combination thereof.

Clause 7. The system according to clause 1, 2, 3, 4, 5 or 6, wherein the processor is further configured to select the at least one responder of the plurality of responders based on the at least one mapping indicating that the at least one responder is capable of resolving the at least one triggering condition.

Clause 8. The system according to clause 1, 2, 3, 4, 5, 6 or 7, wherein the processor is further configured to detect at least one new triggering condition affecting the at least one enterprise computing system, the at least one computer application, or a combination thereof; access the source of truth system to obtain updated data; and generate, based on the updated data and by utilizing the artificial intelligence model, a new prediction associated with the schedule for the at least one responder of the plurality of responders to resolve the at least one new triggering condition.

Clause 9. The system according to clause 1, 2, 3, 4, 5, 6, 7 or 8, wherein the processor is further configured to determine whether the at least one responder resolved the at least one triggering condition; and transmit, if the at least one responder did not resolve the at least one triggering condition, a different notification to a different responder from the plurality of responders to resolve the at least one triggering condition.

Clause 10. The system according to clause 1, 2, 3, 4, 5, 6, 7, 8 or 9, wherein the processor is further configured to output, if the at least one responder did resolve the at least one triggering condition, a confirmation on a graphical user interface of a device that the at least one triggering condition has been resolved.

Clause 11. The system according to clause 1, 2, 3, 4, 5, 6, 7, 8, 9 or 10, wherein the automated action further comprises: execution of a reboot of the at least one enterprise computing system, the at least one computer application, or a combination thereof; switching traffic away from the at least one enterprise computing system, the at least one computer application, or a combination thereof; or execution of a self-healing operation on the at least one enterprise computing system, the at least one computer application, or a combination thereof.

Clause 12. The system according to clause 1, 2, 3, 4, 5, 6, 7, 8, 9, 10 or 11, wherein the processor is further configured to train the artificial intelligence model based on the prediction, an accuracy of the prediction, feedback associated with resolving the at least one triggering condition, the data, or a combination thereof.

Clause 13. A computer-implemented method may include: detecting, by utilizing instructions from a memory that are executed by at least one computing processor, at least one triggering condition affecting at least one enterprise computing system, at least one computer application, or a combination thereof; executing, in response to the at least one triggering condition, by the at least one computing processor, an automated action via an enterprise computing system to attempt to resolve the at least one triggering condition; accessing, by the at least one computing processor, a source of truth system to obtain data comprising at least one mapping between each responder of a plurality of responders, the at least one enterprise computing system, the at least one computer application, or the combination thereof; generating, by the at least one computing processor, based on the data and by utilizing an artificial intelligence scheduling model, a prediction associated with a schedule for at least one responder of the plurality of responders to resolve the at least one triggering condition affecting the at least one enterprise computing system, the at least one computer application, or the combination thereof, wherein the prediction is based at least on the at least one mapping in the data; and transmitting, by the at least one computing processor, based on the prediction and if the automated action via the system fails to resolve the at least one triggering condition, a notification to the at least one responder in accordance with the schedule to resolve the at least one triggering condition affecting the at least one enterprise computing system, the at least one computer application, or the combination thereof.

Clause 14. The computer-implemented method according to clause 13, further comprising selecting the at least one responder from the plurality of responders to receive the notification to resolve the at least one triggering condition based on a most recent utilization of the at least one responder, at least one capability of the at least one responder, availabilities of the plurality of responders, or a combination thereof.

Clause 15. The computer-implemented method according to clause 13 or 14, further comprising further comprising training the artificial intelligence model based on at least one action performed by the at least one responder with respect to the at least one triggering condition.

Clause 16. The computer-implemented method according to clause 13, 14 or 15, further comprising generating an updated prediction associated with the schedule in real-time as the data from the source of truth system changes.

Clause 17. The computer-implemented method according to clause 13, 14, 15 or 16, selecting at least one other responder from the plurality of responders to resolve the at least one triggering condition if the at least one triggering condition is not resolved by the at least one responder.

Clause 18. The computer-implemented method according to clause 13, 14, 15, 16 or 17, further comprising determining an action taken by the at least one responder to resolve the at least one triggering condition.

Clause 19. The computer-implemented method according to clause 13, 14, 15, 16, 17 or 18, further comprising automatically executing the action taken by the at least one responder to resolve the at least one triggering condition when the at least one triggering condition occurs on a subsequent occasion.

Clause 20. A non-transitory computer-readable medium comprising computer instructions, which, when loaded and executed by a processor, cause the processor to be configured to: detect at least one triggering condition affecting at least one enterprise computing system, at least one computer application, or a combination thereof; execute, in response to the at least one triggering condition, an automated action via the system to attempt to resolve the at least one triggering condition; access a source of truth system to obtain data comprising at least one mapping between each responder of a plurality of responders and the at least one enterprise computing system, the at least one computer application, or the combination thereof; generate, based on the data and by utilizing an artificial intelligence model, a prediction associated with a schedule for at least one responder of the plurality of responders to resolve the at least one triggering condition affecting the at least one enterprise computing system, the at least one computer application, or the combination thereof, wherein the prediction is based at least on the at least one mapping in the data; and transmit, based on the prediction and if the automated action via the system fails to resolve the at least one triggering condition, a notification to the at least one responder in accordance with the schedule to resolve the at least one triggering condition affecting the at least one enterprise computing system, the at least one computer application, or the combination thereof.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A system, comprising:

a memory that stores instructions; and a processor that executes the instructions to cause the processor to be configured to:

detect at least one triggering condition affecting at least one enterprise computing system, at least one computer application, or a combination thereof;

execute, in response to the at least one triggering condition, an automated action via the at least one enterprise computing system to attempt to resolve the at least one triggering condition;

access a source of truth system to obtain data comprising at least one mapping between each responder of a plurality of responders and the at least one enterprise computing system, the at least one computer application, or the combination thereof, the at least one mapping being derived from observed responses by the plurality of responders, the plurality of responders being associated with at least one third-party;

generate, based on the data and by utilizing an artificial intelligence model, a prediction associated with a schedule for at least one responder of the plurality of responders to resolve the at least one triggering condition affecting the at least one enterprise computing system, the at least one computer application, or the combination thereof, wherein the prediction is based at least on the at least one mapping;

transmit, via the at least one third-party, based on the prediction and if the automated action via the at least one enterprise computing system fails to resolve the at least one triggering condition, a notification to the at least one responder in accordance with the schedule to resolve the at least one triggering condition affecting the at least one enterprise computing system, the at least one computer application, or the combination thereof;

detect, in response to the at least one responder responding to the notification, at least one resolution to the at least one triggering condition;

determine at least one update to the data associated with the at least one mapping; and modify, based at least in part on the at least one update, the source of truth system to update the data comprising the at least one mapping between each responder of a plurality of responders and the at least one enterprise computing system, the at least one computer application, or the combination thereof to maintain real-time updates of third-party data to the source of truth system.

2. The system of claim 1, wherein the processor is further configured to:

determine at least one resolution step to recommend to the at least one responder to assist the at least one responder in resolving the at least one triggering condition affecting the at least one enterprise computing system, the at least one computer application, or a combination thereof.

3. The system of claim 1, wherein the processor is further configured to:

modify the prediction associated with the schedule in real-time based on receiving at least one signal associated with the plurality of responders, wherein the at least one signal provides an update to the data.

4. The system of claim 1, wherein the processor is further configured to:

dynamically remove or add responders from the plurality of responders as the data from the source of truth system changes over time.

5. The system of claim 1, wherein the processor is further configured to:

determine that the at least one triggering condition comprises:

detection of at least one anomaly associated with the at least one enterprise computing system, the at least one computer application, or a combination thereof, or detection of a failure associated with the at least one enterprise computing system, the at least one computer application, or a combination thereof.

6. The system of claim 1, wherein the processor is further configured to:

integrate the source of truth system with the system, wherein the source of truth system comprises a team repository, a human resource system, an off-boarding and on-boarding database, historical incidents data, or a combination thereof.

7. The system of claim 1, wherein the processor is further configured to:

select the at least one responder of the plurality of responders based on the at least one mapping indicating that the at least one responder is capable of resolving the at least one triggering condition.

8. The system of claim 1, wherein the processor is further configured to:

detect at least one new triggering condition affecting the at least enterprise computing system, the at least one computer application, or a combination thereof;

access the source of truth system to obtain updated data; and generate, based on the updated data and by utilizing the artificial intelligence model, a new prediction associated with the schedule for the at least one responder of the plurality of responders to resolve the at least one new triggering condition.

9. The system of claim 1, wherein the processor is further configured to:

determine whether the at least one responder resolved the at least one triggering condition; and transmit, if the at least one responder did not resolve the at least one triggering condition, a different notification to a different responder from the plurality of responders to resolve the at least one triggering condition.

10. The system of claim 9, wherein the processor is further configured to:

output, if the at least one responder did resolve the at least one triggering condition, a confirmation on a graphical user interface of a device that the at least one triggering condition has been resolved.

11. The system of claim 1, wherein the automated action comprises:

execution of a reboot of the at least one enterprise computing system, the at least one computer application, or a combination thereof;

switching traffic away from the at least one enterprise computing system, the at least one computer application, or a combination thereof; or execution of a self-healing operation on the at least one enterprise computing system, the at least one computer application, or a combination thereof.

12. The system of claim 1, wherein the processor is further configured to:

train the artificial intelligence model based on the prediction, an accuracy of the prediction, feedback associated with resolving the at least one triggering condition, the data, or a combination thereof.

13. A computer-implemented method, comprising:

detecting, by utilizing instructions from a memory that are executed by at least one computing processor, at least one triggering condition affecting at least one enterprise computing system, at least one computer application, or a combination thereof;

executing, in response to the at least one triggering condition, by the at least one computing processor, an automated action via the at least one enterprise computing enterprise computing system to attempt to resolve the at least one triggering condition;

accessing, by the at least one computing processor, a source of truth system to obtain data comprising at least one mapping between each responder of a plurality of responders, the at least one enterprise computing system, the at least one computer application, or the combination thereof, the at least one mapping being derived from observed responses by the plurality of responders, the plurality of responders being associated with at least one third-party;

generating, by the at least one computing processor, based on the data and by utilizing an artificial intelligence scheduling model, a prediction associated with a schedule for at least one responder of the plurality of responders to resolve the at least one triggering condition affecting the at least one enterprise computing system, the at least one computer application, or the combination thereof, wherein the prediction is based at least on the at least one mapping in the data;

transmitting, by the at least one computing processor, based on the prediction and if the automated action via the at least one enterprise computing system fails to resolve the at least one triggering condition, a notification to the at least one responder in accordance with the schedule to resolve the at least one triggering condition affecting the at least one enterprise computing system, the at least one computer application, or the combination thereof;

detecting, by the at least one computer processor, in response to the at least one responder responding to the notification, at least one resolution to the at least one triggering condition;

determining, by the at least one computer processor, at least one update to the data associated with the at least one mapping; and modifying, by the at least one computer processor, based at least in part on the at least one update, the source of truth system to update the data comprising the at least one mapping between each responder of a plurality of responders and the at least one enterprise computing system, the at least one computer application, or the combination thereof to maintain real-time updates of third-party data to the source of truth local system.

14. The computer-implemented method of claim 13, further comprising selecting the at least one responder from the plurality of responders to receive the notification to resolve the at least one triggering condition based on a most recent utilization of the at least one responder, at least one capability of the at least one responder, availabilities of the plurality of responders, or a combination thereof.

15. The computer-implemented method of claim 13, further comprising training the artificial intelligence model based on at least one action performed by the at least one responder with respect to the at least one triggering condition.

16. The computer-implemented method of claim 13, further comprising generating an updated prediction associated with the schedule in real-time as the data from the source of truth system changes.

17. The computer-implemented method of claim 13, further comprising selecting at least one other responder from the plurality of responders to resolve the at least one triggering condition if the at least one triggering condition is not resolved by the at least one responder.

18. The computer-implemented method of claim 13, further comprising determining an action taken by the at least one responder to resolve the at least one triggering condition.

19. The computer-implemented method of claim 18, further comprising automatically executing the action taken by the at least one responder to resolve the at least one triggering condition when the at least one triggering condition occurs on a subsequent occasion.

20. A non-transitory computer-readable medium comprising computer instructions, which, when loaded and executed by a processor, cause the processor to be configured to:

detect at least one triggering condition affecting at least one enterprise computing system, at least one computer application, or a combination thereof;

execute, in response to the at least one triggering condition, an automated action via the at least one enterprise computing system to attempt to resolve the at least one triggering condition;

access a source of truth system to obtain data comprising at least one mapping between each responder of a plurality of responders and the at least one enterprise computing system, the at least one computer application, or the combination thereof, the at least one mapping being derived from observed responses by the plurality of responders, the plurality of responders being associated with at least one third-party;

generate, based on the data and by utilizing an artificial intelligence model, a prediction associated with a schedule for at least one responder of the plurality of responders to resolve the at least one triggering condition affecting the at least one enterprise computing system, the at least one computer application, or the combination thereof, wherein the prediction is based at least on the at least one mapping in the data;

transmit, based on the prediction and if the automated action via the at least one enterprise computing system fails to resolve the at least one triggering condition, a notification to the at least one responder in accordance with the schedule to resolve the at least one triggering condition affecting the at least one enterprise computing system, the at least one computer application, or the combination thereof;

detect, in response to the at least one responder responding to the notification, at least one resolution to the at least one triggering condition;

determine at least one update to the data associated with the at least one mapping; and modify, based at least in part on the at least one update, the source of truth system to update the data comprising the at least one mapping between each responder of a plurality of responders and the at least one enterprise computing system, the at least one computer application, or the combination thereof to maintain real-time updates of third-party data to the source of truth system.

\*  \*  \*  \*  \*